(12) United States Patent
Baker (10) Patent No.: US 11,003,982 B2
(45) Date of Patent: May 11, 2021

(54) ALIGNED TRAINING OF DEEP NETWORKS

(71) Applicant: D5AI LLC, Maitland, FL (US)

(72) Inventor: James K. Baker, Maitland, FL (US)

(73) Assignee: D5AI LLC, Maitland, FL (US)

( * ) Notice: Subject to any disclaimer, the term of this patent is extended or adjusted under 35 U.S.C. 154(b) by 0 days.

(21) Appl. No.: 16/620,214

(22) PCT Filed: Jun. 15, 2018

(86) PCT No.: PCT/US2018/037812
§ 371 (c)(1),
(2) Date: Dec. 6, 2019

(87) PCT Pub. No.: WO2019/005507
PCT Pub. Date: Jan. 3, 2019

(65) Prior Publication Data
US 2021/0081761 A1    Mar. 18, 2021

Related U.S. Application Data

(60) Provisional application No. 62/525,460, filed on Jun. 27, 2017.

(51) Int. Cl.
*G06N 3/063* (2006.01)
*G06N 3/04* (2006.01)
(Continued)

(52) U.S. Cl.
CPC .......... *G06N 3/0454* (2013.01); *G06N 3/084* (2013.01); *G06T 1/20* (2013.01)

(58) Field of Classification Search
CPC ...... G06N 3/063; G06N 3/0454; G06N 3/049; G06N 3/08; G06K 9/3241
(Continued)

(56) References Cited

U.S. PATENT DOCUMENTS

2013/0138436 A1    5/2013    Yu et al.
2015/0199963 A1    7/2015    Maaninen
(Continued)

FOREIGN PATENT DOCUMENTS

WO    WO 2018/175098 A1    9/2018
WO    WO 2018/194960 A1    10/2018
(Continued)

OTHER PUBLICATIONS

International Search Report and Written Opinion for International PCT Application No. PCT/US2018/037812 dated Aug. 31, 2018.
(Continued)

*Primary Examiner* — Gordon G Liu
(74) *Attorney, Agent, or Firm* — K&L Gates LLP (57) ABSTRACT

Computer-based systems and methods guide the learning of features in middle layers of a deep neural network. The guidance can be provided by aligning sets of nodes or entire layers in a network being trained with sets of nodes in a reference system. This guidance facilitates the trained network to more efficiently learn features learned by the reference system using fewer parameters and with faster training. The guidance also enables training of a new system with a deeper network, i.e., more layers, which tend to perform better than shallow networks. Also, with fewer parameters, the new network has fewer tendencies to overfit the training data.

16 Claims, 5 Drawing Sheets

(51) Int. Cl.
*G06N 3/08* (2006.01)
*G06T 1/20* (2006.01)

(58) Field of Classification Search
USPC .......................................................... 706/27
See application file for complete search history.

(56) References Cited

U.S. PATENT DOCUMENTS

| | | | |
|---|---|---|---|
| 2016/0307565 A1* | 10/2016 | Liu | G10L 15/16 |
| 2017/0337682 A1* | 11/2017 | Liao | G06T 7/30 |
| 2018/0336465 A1 | 11/2018 | Kim et al. | |
| 2019/0095798 A1 | 3/2019 | Baker | |

FOREIGN PATENT DOCUMENTS

| | | |
|---|---|---|
| WO | WO 2018/226492 A1 | 12/2018 |
| WO | WO 2018/226527 A1 | 12/2018 |
| WO | WO 2018/231708 A2 | 12/2018 |
| WO | 2019005507 A1 | 1/2019 |
| WO | WO 2019/005507 A1 | 1/2019 |
| WO | WO 2019/005611 A1 | 1/2019 |
| WO | WO 2019/067236 A1 | 4/2019 |
| WO | WO 2019/067248 A1 | 4/2019 |
| WO | WO 2019/067281 A1 | 4/2019 |
| WO | WO 2019/067542 A1 | 4/2019 |
| WO | WO 2019/067831 A1 | 4/2019 |
| WO | WO 2019/067960 A1 | 4/2019 |
| WO | WO 2019/152308 A1 | 8/2019 |

OTHER PUBLICATIONS

International Preliminary Report on Patentability for International PCT Application No. PCT/US2018/037812 dated Jul. 17, 2019.

* cited by examiner

ALIGNED TRAINING OF DEEP NETWORKS

PRIORITY CLAIM

The present application is a national stage application under 35 U.S.C. § 371 of PCT application Ser. No. PCT/US18/37812, filed Jun. 15, 2018, which claims to priority to United States provisional patent application Ser. No. 62/525,460, filed Jun. 27, 2017, with the same title and as inventor as above, and which is incorporated herein by reference in its entirety.

BACKGROUND

Machine learning is a process implemented by computers to self-learn algorithms that can make predictions on data through building models from sample data inputs. There are many types of machine learning system types, such as artificial neural networks (ANNs), decision trees, support vector machines (SVMs), and others. These systems first have to be trained on some of the sample inputs before making meaningful predictions with new data. For example, an ANN typically consists of multiple layers of neurons. Each neuron is connected with many others, and links can be enforcing or inhibitory in their effect on the activation state of connected neurons. Each individual neural unit may have a summation function which combines the values of all its inputs together. There may be a threshold function or limiting function on each connection and on the neuron itself, such that the signal must surpass the limit before propagating to other neurons. The weight for each respective input to a node can be trained by back propagation of the partial derivative of an error cost function, with the estimates being accumulated over the training data samples. A large, complex ANN can have millions of connections between nodes, and the weight for each connection has to be learned.

Deep neural networks, i.e., neural networks with multiple middle layers, tend to perfoini better than shallow neural networks. While deep networks with a large number of parameters have the advantage that they can build more complex functions than shallow network, such deep, complex networks have a tendency to overfit the training data. And deep networks can be time consuming to train.

SUMMARY

In one general aspect, embodiments of this invention provide a process for guiding the learning of features in middle layers of a deep neural network. The guidance can be provided by aligning sets of nodes or entire layers in a network being trained with sets of nodes in a reference system. This guidance facilitates the trained network to more efficiently learn features learned by the reference system using fewer parameters and with faster training. The guidance also enables training of a new system with a deeper network, i.e., more layers, which tend to perform better than shallow networks. Also, with fewer parameters, the new network has fewer tendencies to overfit the training data.

These and other benefits of the present invention will be apparent from the description below.

FIGURES

Various embodiments of the present invention are described herein by way of example in conjunction with the following figures, wherein.

DISCUSSION

Figure 1:
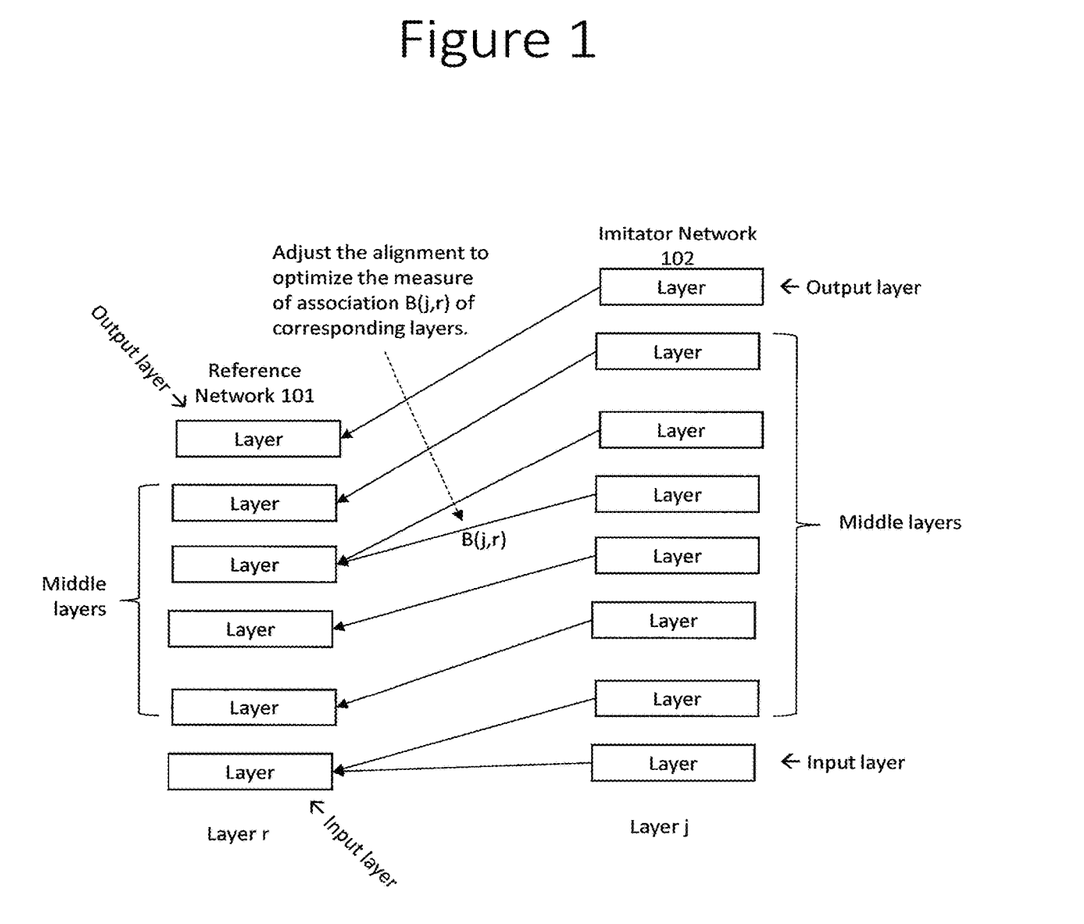
FIG. 1 illustrates a process to align layers of a reference network to layers of an imitation network according to various embodiments of the present invention.

FIG. 1 shows an illustrative embodiment of an aspect of this invention in which alignment is computed between the layers of two deep neural networks. As shown in FIG. 1, each network, i.e., the reference network 101 and the imitation network 102, comprises an input layer, an output layer, and a plurality of middle layers between the respective input and output layers. In the embodiment illustrated in FIG. 1, the two networks are aligned by computing an alignment that optimizes a measure of association between each pair of layers in the respective networks that are aligned. The computed alignment may then be used for further training of one or both networks as described, for example, in connection with in FIG. 3. In this illustrative embodiment, one network is called the reference network 101 and the other is called the imitation network 102. However, in other embodiments, the two networks may have a symmetric relationship and the measure of association may also be symmetric.

For the discussion of FIG. 1, assume there is some measure of association $B[j,r]$ between layer j in the imitation network 102 and layer r in the reference network 101. Examples of such an association measure will be discussed in more detail below in association with FIG. 2. In FIG. 1, the task is to align each layer of the imitation network 102 with a corresponding layer in the reference network 101 such that some criterion is optimized. For example, the measure of association $B(j,r)$ can be the cost of error when, for each item of data, layer j in imitation network 102 tries to predict the values (e.g., activation values of the nodes) in layer r of reference network 101, with the measure averaged over some set of data. In other words, one measure of association is the ability of a layer in the imitation network 102 to predict the values in a corresponding layer in the reference network 101. In such embodiments, the measure of association $B(j,r)$ can be the criterion that is optimized, although in other embodiments other criteria could be optimized.

There are exponentially many ways to align the layers of the imitation network 102 with the layers of the reference network 101. However, there are efficient ways to compute an optimum or near optimum alignment based on dynamic programming. As an illustrative embodiment, the computation can be done with a simplified version of the alignment computation that is well known to those skilled in the art of modeling a hidden Markov process.

Let N be the number of layers in the imitation network, numbered from 0 to N−1. Let M be the number of layers in the reference network, numbered from 0 to M−1. For each j, let R(j) be the number of the layer of the reference network associated with layer number j of the imitation network 102. In an illustrative embodiment, the alignment is constrained to be monotonic. That is, for every j, R(j+1)≥R(j).

The optimum alignment can be computed as indicate in the following pseudo-code, for example:

```
for (t from 0 up to n−1) {
    for (r from 0 up to m−1){
        lastAlign = 0;
        lastScore = 0;
        if (t > 0)
        {
            lastAlign = align[t − 1,r];
            lastScore = A[t − 1,r];
        }
        align[t,r] = lastAlign;
        bestScore = lastScore + B[t,lastAlign];
        for (k from lastAlign up to r) {
            if(lastScore + B[t,k]<bestScore) {
                bestScore = lastScore + B[t,k];
                align[t][r] = k;
            }
        }
        A[t,r] = bestScore;
    }
}
state = align[n − 1,m−1];;
for (t from n − 1 down to 0) {
    R[t] = state;
    state = align[t,state];
}
```

This illustrative pseudo-code computes an optimum alignment. The alignment computation itself requires much less computation than does the training of the neural networks. However, this illustrative embodiment does require computing B[j,r] for all pairs (j,r). In other embodiments, different pseudo-code can be used to compute the optimum alignment. For example, sometimes evaluating B[j,r] is itself a computationally intensive process. Therefore, in such circumstances, an alignment that is only locally optimum is computed rather than globally optimum alignment to reduce the number of pairs (j,r) for which B[j,r] needs to be computed.

Figure 1A:
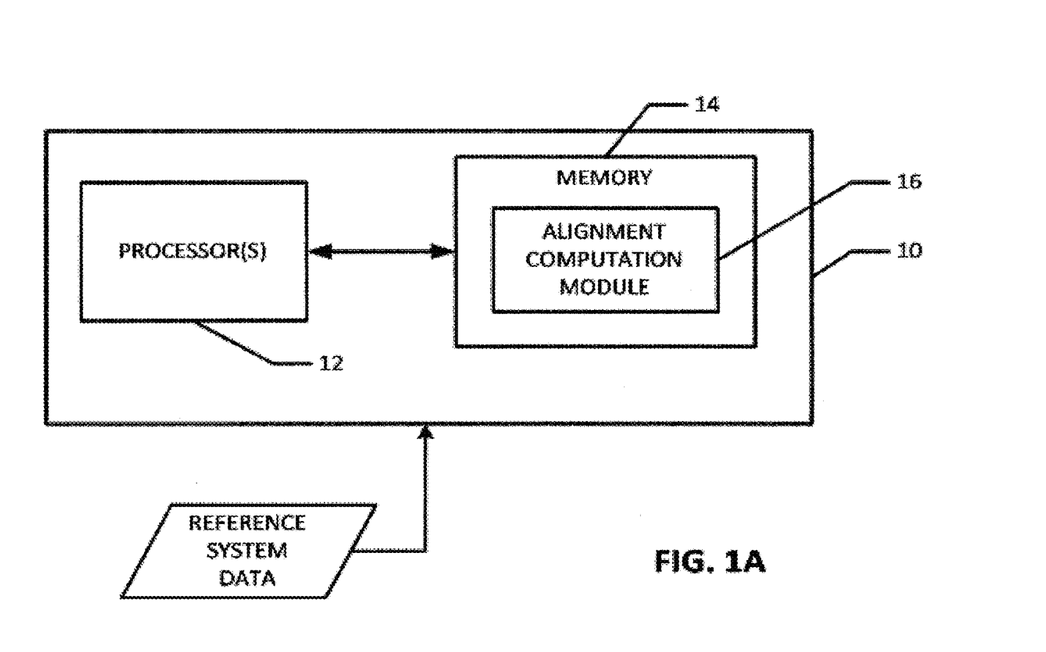
FIGS. 1A and 2A are diagrams of computer systems according to various embodiments of the present invention.

FIG. 1A is a diagram of a computer system 10 that computes the alignments between layers. As shown in FIG. 1A, the computer system 10 comprises one or more processors 12 and computer memory 14. The computer memory 14 may store software for execution by the processor(s), such as an alignment computation module 16 that, when executed by the processor(s), causes the processor(s) 12 to compute the alignment between layers, e.g., using the pseudo-code described above and/or to train the imitation network 102 based on the computed alignment as described below in connection with FIG. 3.

Figure 2:
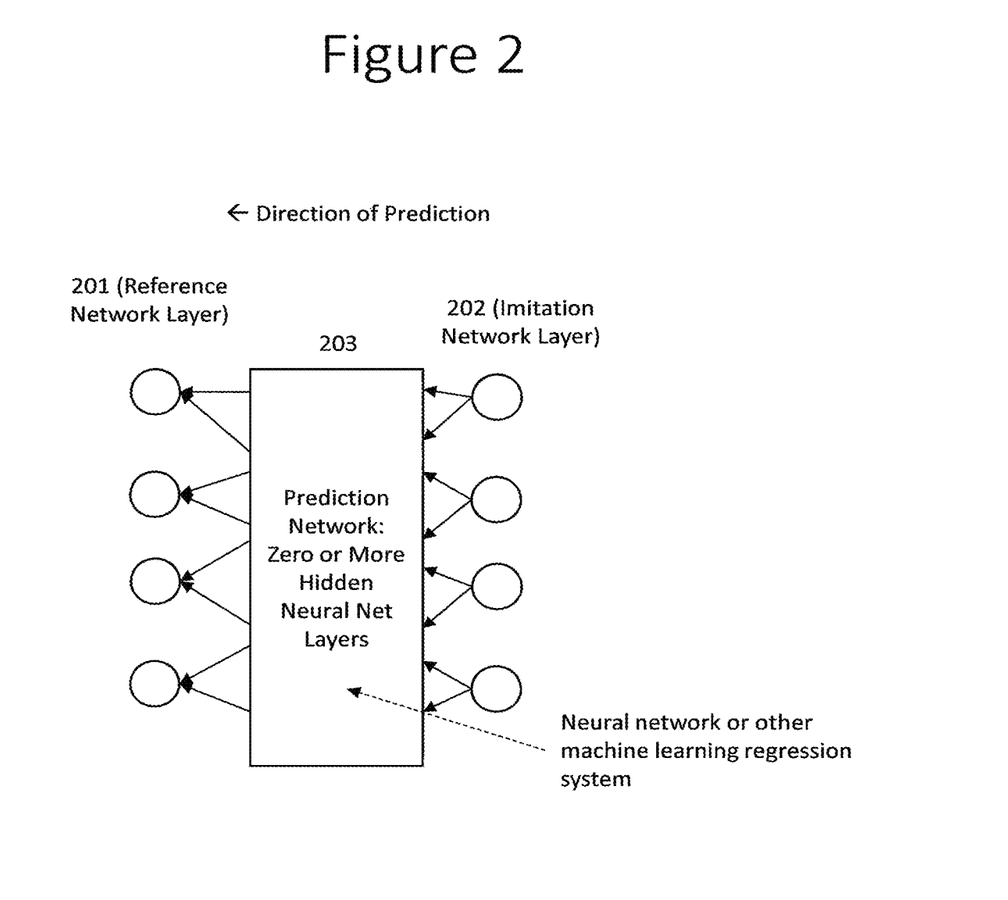
FIG. 2 illustrates a prediction network where a node set in a layer of the imitation network tries to predict the activation values of the nodes in a node set in a layer of the reference network according to various embodiments of the present invention.

FIG. 2 shows an illustrative embodiment of a measure of association between two sets of nodes, in particular a middle layer 202 of the imitation network 102 and a middle layer 201 of the reference network 101. In this illustrative embodiment, the measure of association between the two sets of nodes is the accuracy of one set of nodes (e.g., the nodes of layer 202) being able to predict the activation values of the other node set (e.g., the nodes of layer 201). For embodiments of the process illustrated in FIG. 2, the activation values of the nodes in the two sets of nodes may be determined by any external method. For example, the nodes may be nodes in neural networks with their activations computed by feed forward activation. In this illustrative embodiment, it assumed that there is a set of data D and that, for item number m of the data, each node j in node set 201 has an activation value a[j,m] and each node k in node set 202 has activation value a[k,m]. In one illustrative embodiment, node set 201 comprises a middle layer in reference network 101 from FIG. 1, and node set 202 comprises a middle layer in imitation network 102 from FIG. 1. However, in other embodiments either node set 201 or node set 202 can be any set that that has activation values for the set of data D. For example, either node set 201 or node set 202 can be: a node set that is a proper subset of a layer of a neural network; a node set with members from multiple layers of a network; a set of nodes from some other type of machine learning system; or a set of nodes that compute an arbitrary set of functions of the data, without any learning involved at all.

In the embodiment illustrated in FIG. 2, node set 202 tries to predict the activation values of the nodes in node set 201; the error in its predicted activation values can be used as a measure of the prediction error. For example, assuming $a_{i,m}$, is the value of output node i in the imitation network layer 202 for the prediction for data item m, and $y_{i,m}$ is the value of node i in the reference layer 201 for data item m, then one possible measure of the prediction error is the mean square error (MSE), which can be computed as:

$$MSE = \Sigma_m \Sigma_i (y_{i,m} - a_{i,m})^2 / M$$

where M is the total number of data items. There are many possible embodiments for the prediction system 203. For example, the prediction system 203 can be: a simple multiple regression, which is equivalent to a one layer neural network with no hidden layer and linear outputs; or a logistic regression, which is equivalent to a neural network with no hidden layer and sigmoid output nodes. More generally, the prediction network 203 can be an arbitrary neural network with an arbitrary number of hidden layers, or it can be any other type of machine learning system or predictor.

An important property in the training of the prediction system 203 is that it is a regression system with output values that do not require classification category labels. Furthermore, in embodiments in which the system 201 has already been trained when prediction system 203 is being trained, only the activation values of the nodes in reference system 201 need to be known, not the output labels. That is, prediction system 203 can be trained on unlabeled data. Many applications have a much larger amount of unlabeled data than labeled data, in which case there is more data for training prediction system 203.

The prediction system 203 can be trained by any suitable machine learning technique, including those known to people skilled in the art of machine learning. For example, if the prediction system 203 is a neural network, it can be trained by stochastic gradient descent with the partial derivatives for each item m of data being computed by back propagation and with updates done in minibatches, as illustrated in the pseudo-code below, where $y_j(m)$ is the activation of node j in node set 201 for data item m.

---

Pseudocode of stochastic gradient descent of a regression network with sigmoid output nodes

---

1. $a_{l-1,0}(m) = 1$, is constant, so $w_{l,0,j}$ is a bias for node j in layer l
2. For each epoch until stopping criterion is met
    a. Input a set (minibatch number t) of training examples; repeat for each minibatch in epoch
        1. For each training example m, set $a_{0,i}(m)$ and perform the following steps:

-continued

Pseudocode of stochastic gradient
descent of a regression network with sigmoid output nodes 1. Feedforward (sigmoid output): For each l = 1, 2, ..., L − 1 compute $z_{l,j}(m) = \sum_{i=0}^{n_l} w_{l-1,i,j} a_{l-1,i}(m)$, $a_{l,j}(m) = \sigma(z_{l,j}(m))$;

2. Sigmoid output: $a_{L,k} = 1/(1 + \exp(-z_{L,j}))$;
3. Output error gradient (m):
   1. $\delta_{L,j}(m) = -(y_j(m) - a_{L,j}(m))a_{L,j}(m)(1 - a_{L,j}(m))$
4. Backpropagate error gradient: For each l = L−1, L−2, ...,2, 1 compute $\delta_{l-1,i}(m) = (a_{l-1,i}(m)(1 - a_{l-1,i}(m))\sum_{j=1}^{n_l} w_{l,i,j}\delta_{l,j}(m)$ 2. Compute gradient for minibatch:

$\Delta_{l-1,i} = \sum_{m=1}^{M} a_{l-1,i}(m)\delta_{l,j}(m)/M$

Figure 2A:
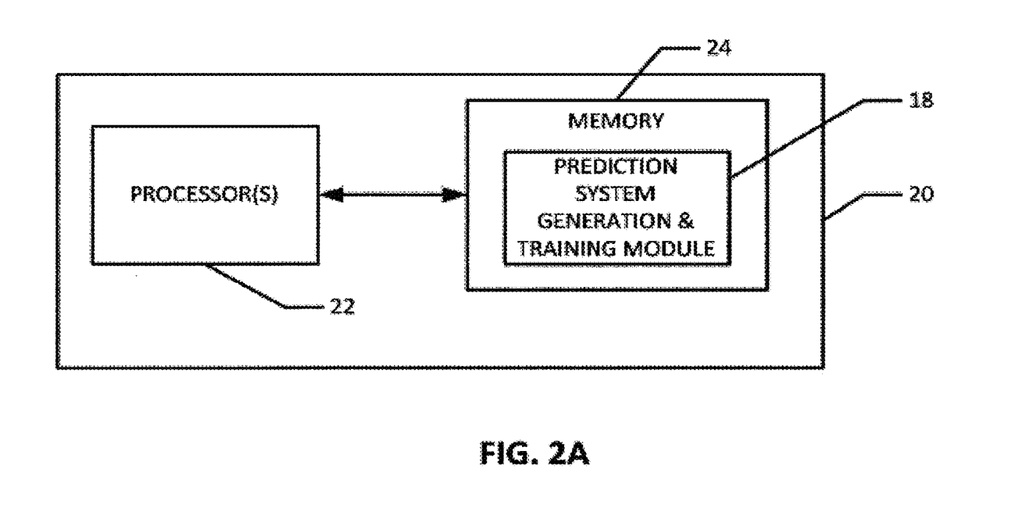

3. Compute momentum: $v_{l,i,j} \rightarrow v'_{l,i,j} = \mu_{l,i,j} v_{l,i,j} - \eta_{l,i,j}\Delta_{l-1,i}$
4. Gradient descent: For each l = L−1, L−2, ...,2, 1 update the weights $w_{l,i,j} \rightarrow w'_{l,i,j} = w_{l,i,j}(1 - \lambda_{l,i,j}) - v'_{l,i,j}$ FIG. 2A is a diagram of a computer system 20 for generating and training the prediction network 203. As shown in FIG. 2A, the computer system 20 comprises one or more processors 22 and computer memory 24. The computer memory may store software for execution by the processor(s), such as a prediction network generation and training module 18 that, when executed by the processor(s), causes the processor(s) to generate and train the prediction network 203 as described above.

In some embodiments, the roles of reference network 101 and imitation network 102 are reversed, in which case the network 101 predicts the network 102. In one illustrative embodiment, there is a prediction network 203 in each direction and the association between network 101 and network 102 is symmetric.

Figure 3:
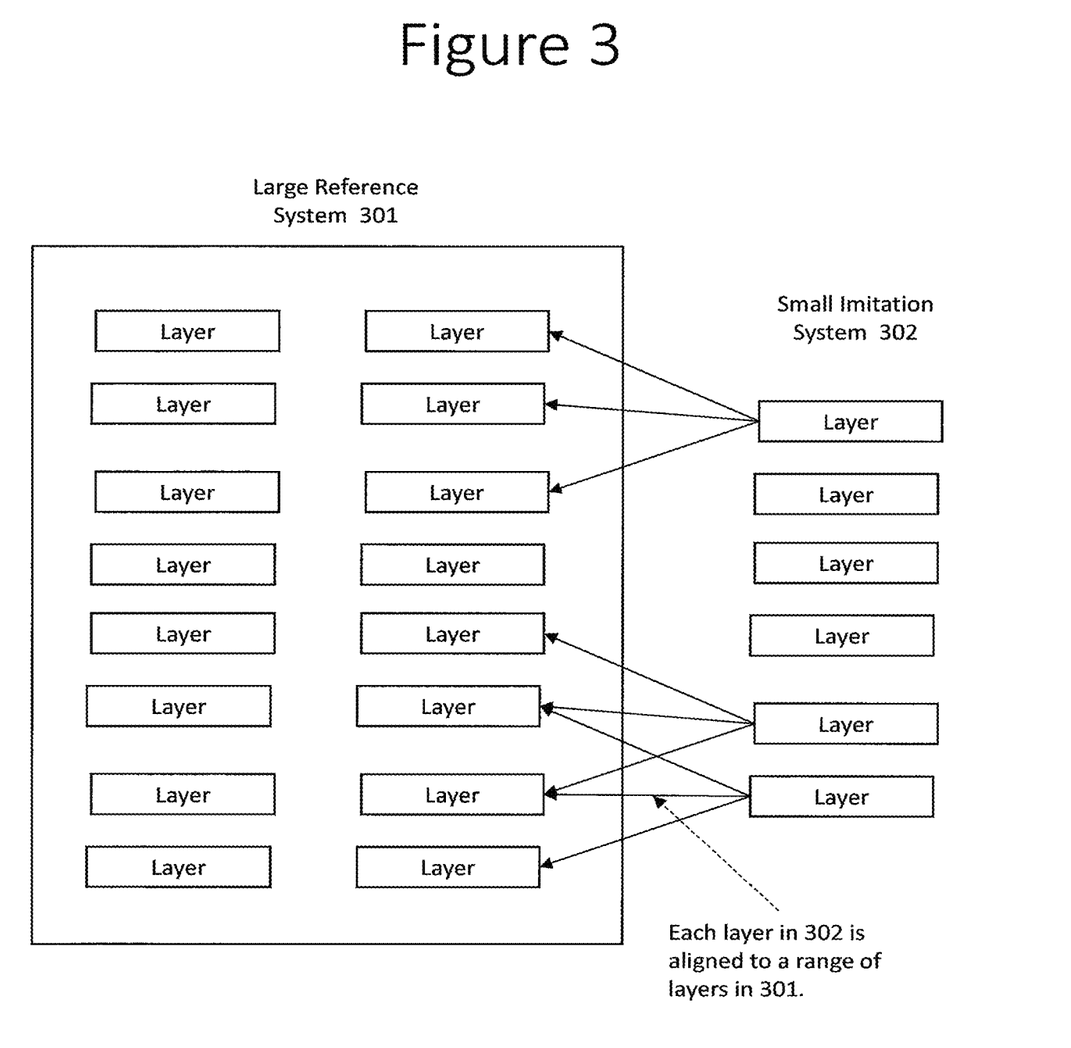
FIG. 3 illustrates a process to align layers of an ensemble reference network to layers of an imitation network according to various embodiments of the present invention.

In an illustrative embodiment shown in FIG. 3, reference system 101 can be an ensemble of neural networks that have already been trained, and imitation system 102 is a single neural network to be trained. Unlike the optimum alignment computed in the illustrative embodiment of FIG. 1, FIG. 3 illustrates a computation of an alignment that is only locally optimum. In an illustrative embodiment, there is a specified initial alignment between the layers in imitation network 302 and the layers in the members of the reference ensemble 301. In addition, in the illustrative embodiment, each layer in imitation system 302 predicts not a single layer in reference system 301 but a range of layers in reference system 301. For example, imitation system 302 can predict the layer that is estimated to have the lowest cost of prediction error, as well as an additional N layers above and below that layer (e.g., N=2). When one of those N adjacent layers in either direction has a lower cost of prediction error for some amount of training data, in an illustrative embodiment, the range of layers being predicted by a layer of imitation system 302 can be shifted to a range with the layer with the then lowest prediction error cost at the center of the range. Thus, this illustrative embodiment tracks changes in the locally best alignment during the course of the training.

In one illustrative embodiment, alignments among the members of the ensemble are pre-computed, that is, computed before the training of imitation network 302. The alignment of members of an ensemble is an example of a situation in which a symmetric association function can be used, rather than a one-way prediction.

In other embodiments, imitation system 302 has a separate alignment with each member of the ensemble. In these illustrative embodiments, the tracking of the locally optimum alignment described above can also be done separately for each member of the ensemble.

In some embodiments reference system 301 can be a single large system. In some embodiments, there can be multiple node sets in each layer of imitation system 302. Each of these node sets can have a separate alignment, which can be tracked and locally optimized separately from other node sets in the same layer. In some illustrative embodiments, a node set in imitation system 302 can have as its set of prediction targets a subset of the nodes in a layer of reference system 301. For example, a set of nodes that forms a vector of related features can be a set of nodes in imitation system 302 to be aligned separately. Similarly, such a feature vector can be a set of targets for a prediction network. For example, a feature vector that is constrained or trained to collectively have sparse activations can be aligned in the same way as an entire layer. As another example, a set of nodes to which a softmax activation is applied can also be treated as such a feature vector.

In another illustrative embodiment, reference system 301 can be a more diverse collection of networks rather than an ensemble with a shared set of output classification categories. For example, reference system 301 can include networks that detect specific features that might be detected in middle layers in imitation system 302. For example, in an image recognition task, some networks in the collection of networks in reference system 301 might detect edges, with the detection of edges being their final output rather than merely an inner layer of a deeper network. As another example, in a speech recognition task, one or more networks in the collection of reference system 301 might detect phonemes, or even shorter phonetic elements, rather than output words or sentences. In an illustrative embodiment, the alignment computation for such examples would terminate with the alignment of a node set in a middle layer of imitation system 302 to the output of the reference system member, rather than being an alignment of a node set from each layer of imitation system 302.

In some embodiments, imitation system 302 may itself be a large system or ensemble. In some embodiments, the imitation system 302 may be larger than reference system 301.

However, in another general aspect of this invention, imitation system 302 is preferably smaller than reference system reference system 301, in at least some ways, as indicated by the annotations in FIG. 3. For example, in some embodiments, imitation system 302 has many fewer learned parameters than reference system 301. In some embodiments, imitation system 302 may be thinner, with fewer nodes per layer than layer than reference system 301, although, in such a case, imitation system 302 may be deeper, with more layers than reference system 301. In another example, imitation system 302 may have node sets with sparse activations or employ an architecture with sparse connections.

In each of these examples, a major benefit is that, with fewer parameters and with other constraints, imitation system 302 can learn the middle layer features from reference system 301, but will have less tendency to overfit the training data. That is, middle layers of imitation system 302 can learn to predict the activations of middle layers of reference system 301, for example as illustrated in FIG. 2. In a preferred embodiment, one or more nodes in one or more of the middle layers of imitation system 302 may have an extra regularization term added to their objective functions based in part on the prediction error from a layer or set of nodes in imitation system 302 to the aligned layer or set of nodes in reference system 301. In this embodiment, this cross-network regularization makes it easier to train system 302, in particular if it is otherwise difficult to train because of a tall, thin architecture. However, with fewer parameters, the prediction will not be perfect and system 302 will be less likely to over fit. In one preferred embodiment, reference system 301 is trained on a subset of training dataset D1, but another set of data (call it dataset D2) is set aside, i.e., not used, during the training of reference system 301. Later, imitation system 302 is trained on dataset D2. In this embodiment, imitation system 302, being trained on D2, will learn to ignore discriminations that over fit training data D1, but that do not generalize to training dataset D2. D2 can also be used as validation data for reference system 301.

In many of the successful applications of deep learning, deeper networks have outperformed previous state-of-the-art performance of networks with fewer layers. However, the process of simply building deeper networks by adding more layers has limitations. In particular, there are two problems that make opposite demands on the network architecture. First, with a large number of parameters, a deeper neural network can build more complex functions, which increases the tendency to overfit the training data. Second, with many layers, the complex, non-linear nature of the functions makes it increasingly difficult to explore the parameter space to learn parameter settings that minimize the objective function. The learning exploration problem is easier in wide networks with many redundant ways to represent the intermediate features, but adding more nodes to each layer aggravates the problem of overfitting. In several cases, deeper thinner networks (i.e., networks with more layers, but fewer nodes per layer) have demonstrated better performance with fewer parameters, but they have been more difficult to train.

The techniques of this invention can facilitate the training of deep thin networks, with more layers and fewer nodes per layer. In an illustrative embodiment, imitation system 302 is given an architecture with multiple layers "m" (e.g., two to ten layers) for each layer in reference system 301. This embodiment also applies to cases in which reference system 301 is a collection of networks with varying numbers of layers. Let n be the average number of layers in the networks in reference system 301. Then, imitation system 302 can have m*n layers. The quantities m and n can be integers or fractional amounts. In this illustrative embodiment, m>1. In the initial alignment of layers in imitation system 302, let layer k be a reference layer in reference system 301 that is aligned with lawyer q in imitation system 302. In an illustrative embodiment, in the initial alignment q can be approximately equal to k*m. Since m>1, q will be greater than k. In other words, in this initial alignment there will be more layers up to layer q in the imitation system 302 than up to layer k in reference system 301. Not only does imitation system 302 have more layers in total, but in this illustrative embodiment, each layer in imitation system 302 is aligned to a reference layer that has fewer lower layers. With the greater number of layers in the imitation system 302, the number of nodes per layer can generally be reduced, but the learning will still be guided by the association with reference system 301. In embodiments of this invention, the improved ability of a deeper, thinner network to better match the final output of a network also applies to the ability of intermediate layers, such a layer q, to match the features learned by aligned layers, such as layer k in reference system 301

An additional benefit of many of these embodiments of imitation system 302 is that they require less computation and less memory than reference system 301. With less tendency to overfit the training data, and with deeper, thinner networks, the reduction in computation may be accompanied by improved classification accuracy.

In another embodiment of the invention, training data is separated into K subsets, with K−1 of the subsets combined to form D1 for training reference system 301 and one of the K subsets set aside as D2 for training imitation system 302. There are K different ways to choose which of the K subsets to use as D2, enabling the training of K different imitation systems 302. For each of these K subsets, different data is chosen for training the prediction networks 303. The data used for training the prediction networks 303 does not need to be labeled, and therefore does not need to be taken from the pool of labeled training data from which D1 and D2 are selected. This process produces an ensemble of K imitation systems 302. In general, this ensemble will have even better performance than any one of the K imitation systems 302 individually.

Figure 4:
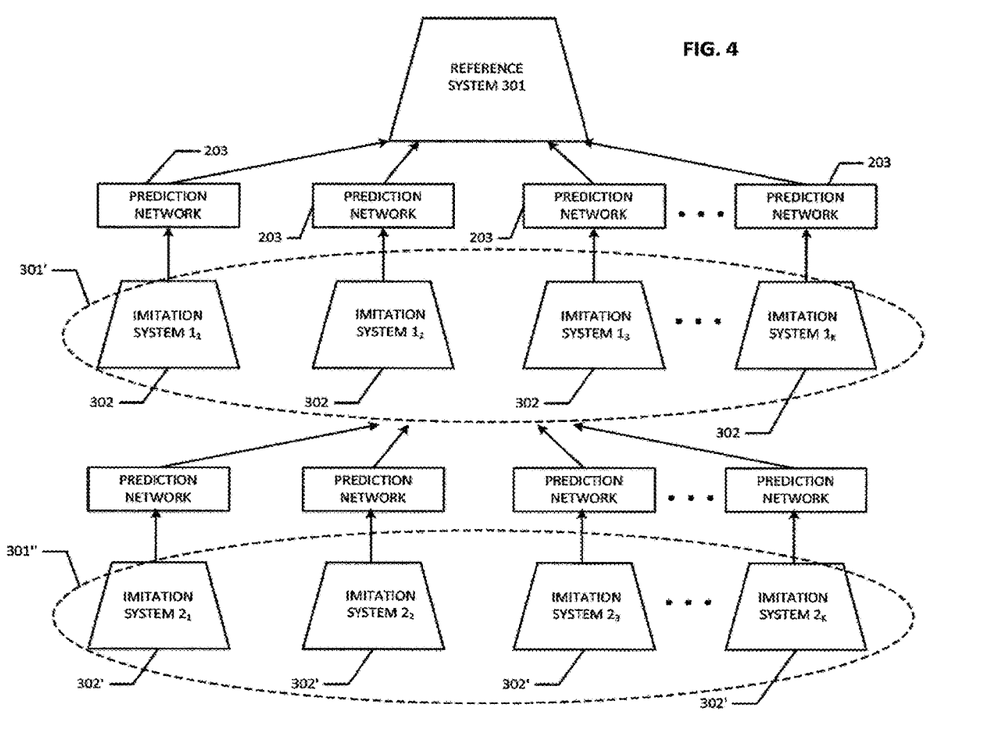
FIG. 4 illustrates an ensemble of imitation systems that can be used as a reference system to generate even further imitation systems according to various embodiments of the present invention.

An example of this is shown in FIG. 4, which shows K 1st-round imitation systems 302 and K corresponding prediction networks 203 for predicting layers in the reference system 301. The ensemble of K imitation systems 302 can then used as a reference system 301', to iteratively produce a new ensemble 301" of imitation systems 302' according to any of the techniques described herein to generate the imitation system, with the new ensemble 301" potentially providing even better performance than the ensemble 301' and the original reference system 301, using computation and memory comparable to a single one of the first-round systems 302. The second-round imitation systems 30T can have even more layers than the first-round systems 302. Some embodiments repeatedly use such a multi-round process to produce a deeper network with an increase in depth that is the product the values of m for each of the respective rounds. For example, yet more imitation systems could be generated to imitate the 2nd-generation reference system 301" and so on. For example, if m is equal to 3 for each round and there are 3 rounds, then the depth is increased by a total factor of $3^3=27$. The value of m may be different for different rounds.

Based on the above description, it is clear that embodiments of the present invention can be used to improve deep neural networks, in a variety of applications. For example, embodiments of the present invention can improve recommender systems, speech recognition systems, and classification systems, including image and diagnostic classification systems, to name but a few examples, such as by making them deeper, thinner, and less susceptible to overfitting the training data.

Referring back to FIGS. 1A and 2A, the computer systems 10, 20 can be implemented with computer hardware and software. For example, they could be part of an integrated computer system (e.g., a server or network of servers) that has multiple processing CPU cores. The program instructions, including the modules 16, 18, could be stored in computer memory that is accessible by the processing cores, such as RAM, ROM, processor registers or processor cache, for example. In other embodiments, the processor(s) may comprise graphical processing unit (GPU) cores, e.g. a general-purpose GPU (GPGPU) pipeline, or processing cores of an AI accelerator chip(s) (ASIC(s)). GPU cores operate in parallel and, hence, can typically process data more efficiently that a collection of CPU cores, but all the cores execute the same code at one time. AI accelerators are a class of microprocessor designed to accelerate artificial neural networks. They typically are employed as a co-processor in a device with a host CPU as well. An AI accelerator typically has tens of thousands of matrix multiplier units that operate at lower precision than a CPU core, such as 8-bit precision in an AI accelerator versus 64-bit precision in a CPU core. Also, the computer systems 10, 20 could be part of a distributed computer system. For example, the computer devices (e.g., servers) that implement the reference and/or imitation system may be remote from the computer systems 10, 20 and interconnected by data networks, such as a LAN, WAN, the Internet, etc., using suitable wired and/or wireless data communication links. Data may be shared between the various systems using suitable data links, such as data buses (preferably high-speed data buses) or network links (e.g., Ethernet).

The software for the various compute systems described herein and other computer functions described herein may be implemented in computer software using any suitable computer programming language such as .NET, C, C++, Python, and using conventional, functional, or object-oriented techniques. Programming languages for computer software and other computer-implemented instructions may be translated into machine language by a compiler or an assembler before execution and/or may be translated directly at run time by an interpreter. Examples of assembly languages include ARM, MIPS, and x86; examples of high level languages include Ada, BASIC, C, C++, C#, COBOL, Fortran, Java, Lisp, Pascal, Object Pascal, Haskell, ML; and examples of scripting languages include Bourne script, JavaScript, Python, Ruby, Lua, PHP, and Perl.

In one general aspect, therefore, the present invention is directed to computer systems and methods for training a first deep neural network 102, 302, where the first deep neural network comprises an input layer, and output layer, and a plurality of middle layers. A method according to various embodiments of the present invention comprises training, with a computer system 10, the first deep neural network based on an alignment of the layers of the first deep neural network to layers of a second, already-trained, deep neural network 101, 301, where the second deep neural network similarly comprises an input layer, and output layer, and a plurality of middle layers.

According to various implementations, the method further comprises, prior to training the first deep neural network based on the alignment, aligning, with the computer system, the layers of the first deep neural network to the layers of a second, already-trained, deep neural network. Aligning the layers can comprise computing an alignment that optimizes a measure of association between each pair of layers in the first and second networks that are aligned. In particular, aligning the layers can comprise computing a prediction error for some amount of training data between a layer of the first deep neural network and a corresponding layer in the second deep neural network to which the layer in the first deep neural network is aligned. Also, training the first deep neural network can comprise adding an extra regularization term to the objective function of one or more nodes in the layer of the first deep neural network, wherein the extra regularization term is based on the computed prediction error. Computing the prediction error can comprise computing the prediction error with a prediction network 203, which can comprise a neural network whose input layer is the layer of the first deep neural network and whose output layer is the layer of the second deep neural network. Additionally or alternatively, training the first deep neural network may comprise training the first deep neural network on validation data for the second deep neural network that was set aside and not used for training the second deep neural network. Also, in various implementations, aligning the layers may comprise computing a locally optimum alignment between pairs of layers in the first and second deep neural networks.

In one general aspect, the computer system 10 according the present invention may comprise a set of one or more processor cores 12 and computer memory 14 in communication with the set of processor cores. The computer memory stores software that when executed by the set of processor cores, causes the processor cores to train the first deep neural network 102, 302 based on the alignment of the layers of the first deep neural network to layers of a second, already-trained, deep neural network 101, 301. In various implementations, the computer memory further stores instructions that when executed by the set of processor cores cause the set of processor cores to, prior to training the first deep neural network based on the alignment, align the layers of the first deep neural network to the layers of the second deep neural network. The computer memory may further store instructions that when executed by the set of processor cores cause the set of processor cores to align the layers by computing an alignment that optimizes a measure of association between each pair of layers in the first and second networks that are aligned. Also, the computer memory may further store instructions that when executed by the set of processor cores cause the set of processor cores to: (i) align the layers by computing a prediction error for some amount of training data between a layer of the first deep neural network and a corresponding layer in the second deep neural network to which the layer in the first deep neural network is aligned; and (ii) train the first deep neural network by adding an extra regularization term to the objective function of one or more nodes in the layer of the first deep neural network, wherein the extra regularization term is based on the computed prediction error.

Still further, the computer memory may further store instructions that when executed by the set of processor cores cause the set of processor cores to compute the prediction error by computing the prediction error with a prediction network. Additionally or alternatively, the computer memory may further store instructions that when executed by the set of processor cores cause the set of processor cores to train the first deep neural network by training the first deep neural network on validation data for the second deep neural network that was set aside and not used for training the second deep neural network. Also, the computer memory may further store instructions that when executed by the set of processor cores cause the set of processor cores to align the layers by computing a locally optimum alignment between pairs of layers in the first and second deep neural networks.

Additionally, each middle layer of the first deep neural network may predict a range of N>1 middle layers of the second deep neural network. For example, the first deep neural network may comprise a single deep neural network and the second deep neural network comprises an ensemble of deep neural networks. Also, the first deep neural network may have fewer learned parameters than the second deep neural network. Still further, the first deep neural network may have more or fewer layers than the second deep neural network. Where the first deep neural network has more layers, every middle layer in the first deep neural network that is aligned to a middle layer in the second deep neural network may have more lower layers than the corresponding middle layer in the second deep neural network to which the middle layer in the first deep neural network is aligned. And in various implementations, the middle layers of the first deep neural network have fewer nodes on average than the middle layers of the second deep neural network.

The set of one or more processor cores comprises one or more GPU cores and/or one or more AI accelerator cores.

The examples presented herein are intended to illustrate potential and specific implementations of the present invention. It can be appreciated that the examples are intended primarily for purposes of illustration of the invention for those skilled in the art. No particular aspect or aspects of the examples are necessarily intended to limit the scope of the present invention. Further, it is to be understood that the figures and descriptions of the present invention have been simplified to illustrate elements that are relevant for a clear understanding of the present invention, while eliminating, for purposes of clarity, other elements. While various embodiments have been described herein, it should be apparent that various modifications, alterations, and adaptations to those embodiments may occur to persons skilled in the art with attainment of at least some of the advantages. The disclosed embodiments are therefore intended to include all such modifications, alterations, and adaptations without departing from the scope of the embodiments as set forth herein.

The invention claimed is:

1. A method of training a second deep neural network to imitate a first deep neural network, wherein the first deep neural network is pretrained and comprises an input layer, and output layer, and a plurality of middle layers, such that the first deep neural network comprises M layers denoted 0, ..., M−1, where M is greater than 3, where the $0^{th}$ layer is the input layer of the first deep neural network, and the M−$1^{th}$ layer is the output layer of the first deep neural network, and where each of the M layers of the first deep neural network comprises one or more nodes, the method comprising:
aligning, with a computer system, the layers of the second deep neural network to layers of the first deep neural network, wherein the second deep neural network comprises an input layer, and output layer, and a plurality of middle layers, such that:
the second deep neural network comprises N layers denoted 0, ..., N−1, where N is greater than 3, where the $0^{th}$ layer is the input layer of the second deep neural network, and the N−$1^{th}$ layer is the output layer of the second deep neural network, where each of the N layers of the second deep neural network comprises one or more nodes, and where M is less than N;
each layer of the second deep neural network is aligned with a single layer of the first deep neural network and each layer of the first deep neural network is aligned to one or more layers of the second deep neural network, wherein:
aligning the layers of the first and second deep neural networks comprises computing an alignment, by the computer system, that optimizes a measure of association $B(j,k)$ between pairs of layers in the first and second deep neural networks, wherein j is a layer of the second deep neural network and k is a layer of the first deep neural network; and the measure of association $B(j,k)$ measures an accuracy of activation values of the one or more nodes of the jth layer of the second deep neural network to predict activation values of the one or more nodes of the kth layer of the first deep neural network; and
training, with the computer system, the second deep neural network based on the alignment of the layers of the second deep neural network to the layers of the first deep neural network.

2. The method of claim 1, wherein:
training the first deep neural network comprises adding an extra regularization term to an objective function of one or more nodes in the jth layer of the second deep neural network, wherein the extra regularization term is based on the measure of association $B(j,k)$.

3. The method of claim 2, wherein computing the measure of association $B(j,k)$ comprises computing the measure of association $B(j,k)$ with a prediction network.

4. The method of claim 3, wherein the prediction network comprises a neural network whose input layer is the jh layer of the second deep neural network and whose output layer is the kth layer of the first deep neural network.

5. The method of claim 2, wherein training the second deep neural network comprises training the second deep neural network on validation data for the first deep neural network that was set aside and not used for training the first deep neural network.

6. The method of claim 1, wherein aligning the layers comprises computing a locally optimum alignment between pairs of layers in the first and second deep neural networks.

7. The method of claim 1, wherein aligning the layers of the first and second deep neural networks comprises aligning the layers such that for any layer j in the second deep neural network, where $0 \le j < (N-1)$:
the jth layer is aligned with the kth layer of the first deep neural network, where $0 \le k < (M-1)$; and
the j+1th layer of the second deep neural network is aligned to one of the layers from k to (M−1), inclusive, of the first deep neural network.

8. A computer system for training a second deep neural network to imitate a first deep neural network, wherein the first deep neural network is pretrained and comprises an input layer, and output layer, and a plurality of middle layers, such that the first deep neural network comprises M layers denoted 0, ..., M−1, where N is greater than 3, where the $0^{th}$ layer is the input layer of the first deep neural network, and the M−$1^{th}$ layer is the output layer of the first deep neural network, and where each of the M layers of the first deep neural network comprises one or more nodes, the computer system comprising:
a set of one or more processor cores; and
computer memory in communication with the set of processor cores, wherein the computer memory stores software that when executed by the set of processor cores, causes the processor cores to:
align the layers of the second deep neural network to layers of the first deep neural network, wherein the second deep neural network comprises an input layer, and output layer, and a plurality of middle layers, such that:
the second deep neural network comprises N layers denoted 0, ..., N−1, where N is greater than 3, where the 0th layer is the input layer of the second deep neural network, and the N−1th layer is the output layer of the second deep neural network, where each of the N layers of the second deep neural network comprises one or more nodes, and where M is less than N;

each layer of the second deep neural network is aligned with a single layer of the first deep neural network and each layer of the first deep neural network is aligned to one or more layers of the second deep neural network;

aligning the layers comprises computing an alignment that optimizes a measure of association B(j,k) between pairs of layers in the first and second deep neural networks, wherein j is a layer of the second deep neural network and k is a layer of the first deep neural network; and the measure of association B(j,k) measures an accuracy of activation values of the one or more nodes of the jth layer of the second deep neural network to predict activation values of the one or more nodes of the kth layer of the first deep neural network; and train the second deep neural network based on the alignment of the layers of the second deep neural network to the layers of the second deep neural network.

9. The computer system claim 8, wherein the computer memory further stores instructions that when executed by the set of processor cores cause the set of processor cores to:

train the second deep neural network by adding an extra regularization term to an objective function of one or more nodes in the jth layer of the first second deep neural network, wherein the extra regularization term is based on the computed measure of association B(j,k).

10. The computer system claim 9, wherein the computer memory further stores instructions that when executed by the set of processor cores cause the set of processor cores to compute the measure of association B(j,k) by computing the measure of association B(j,k) with a prediction network.

11. The computer system claim 10, wherein the prediction network comprises a neural network whose input layer is the jth layer of the second deep neural network and whose output layer is the kth layer of the first deep neural network.

12. The computer system claim 9, wherein the computer memory further stores instructions that when executed by the set of processor cores cause the set of processor cores to train the second deep neural network by training the second deep neural network on validation data for the first deep neural network that was set aside and not used for training the first deep neural network.

13. The computer system claim 8, wherein the computer memory further stores instructions that when executed by the set of processor cores cause the set of processor cores to align the layers by computing a locally optimum alignment between pairs of layers in the first and second deep neural networks.

14. The computer system of claim 8, wherein the set of one or more processor cores comprises one or more GPU cores.

15. The computer system of claim 8, wherein the set of one or more processor cores comprises one or more AI accelerator cores.

16. The computer system of claim 8, wherein the computer memory further stores instructions that when executed by the set of processor cores cause the set of processor cores to align the layers such that or any layer j in the second deep neural network, where $0<j<(N-1)$:

the jth layer is aligned with the kth layer of the first deep neural network, where $0<k<(M-1)$; and the (j+1)th layer of the second deep neural network is aligned to one of the layers from k to (M−1), inclusive, of the first deep neural network.

* * * * *